No. 700,034. Patented May 13, 1902.
J. GODDARD.
PHOTOGRAPHIC PLATE HOLDER.
(Application filed Jan. 17, 1902.)
(No Model.) 2 Sheets—Sheet 1.
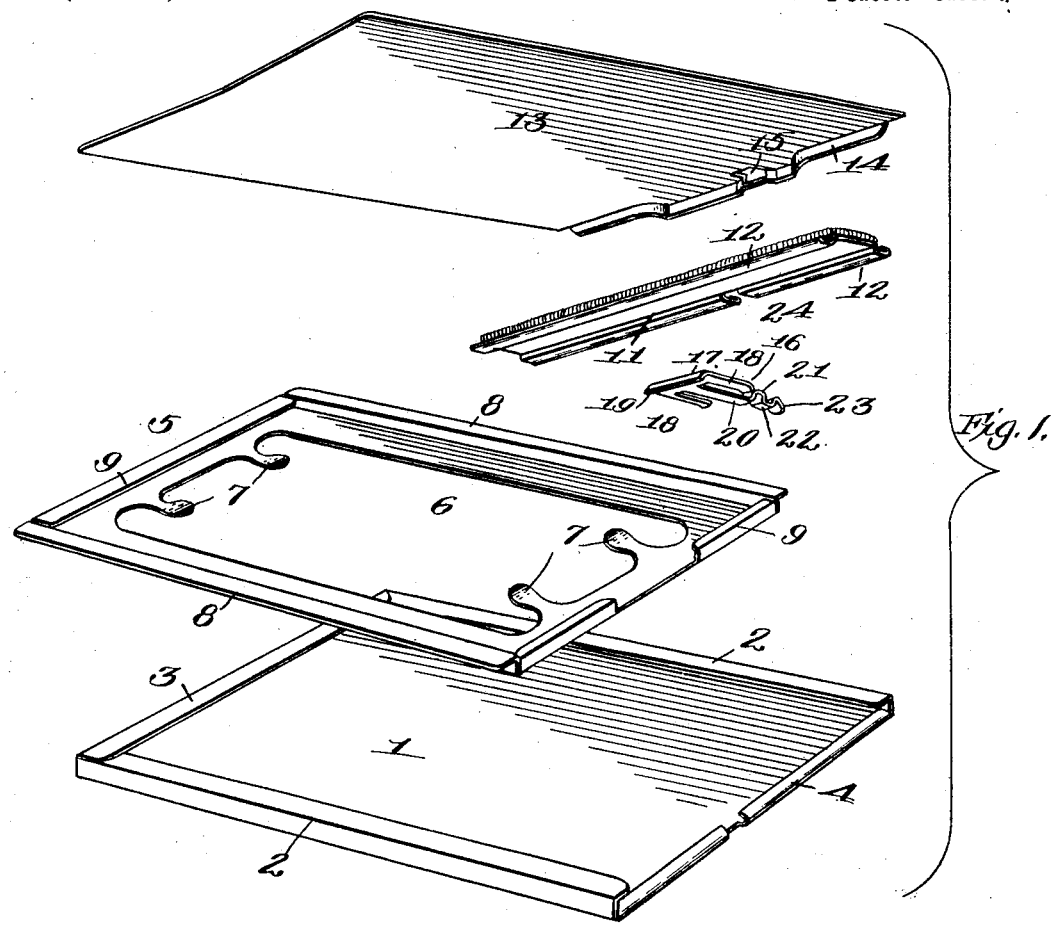
Fig. 1.
Fig. 2.
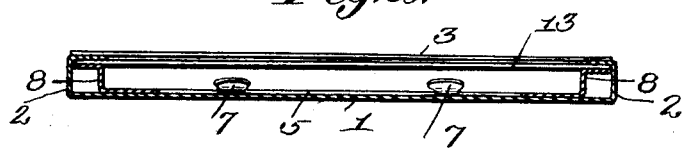
Witnesses:
Inventor
Joseph Goddard
By
James L. Norris
Atty.

No. 700,034. Patented May 13, 1902.
J. GODDARD.
PHOTOGRAPHIC PLATE HOLDER.
(Application filed Jan. 17, 1902.)
(No Model.) 2 Sheets—Sheet 2.
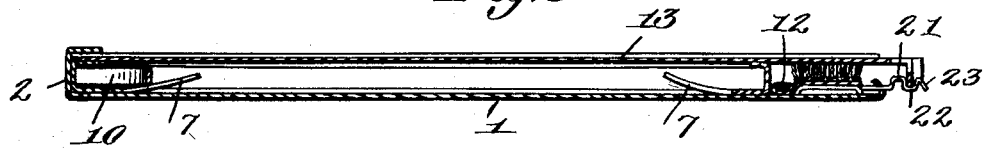
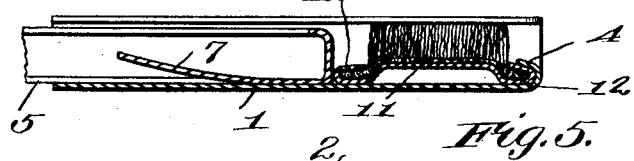
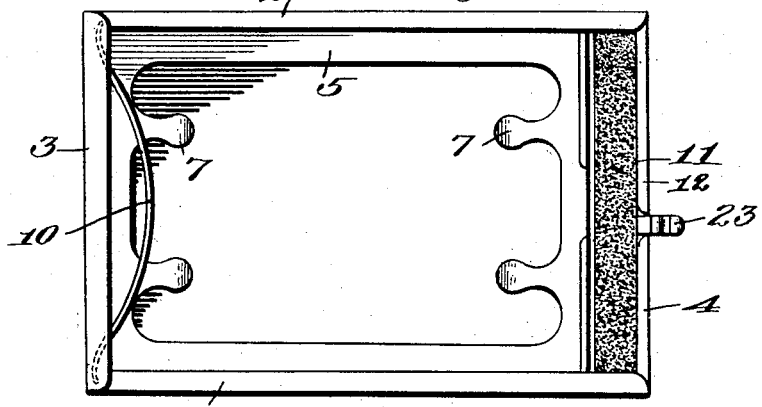
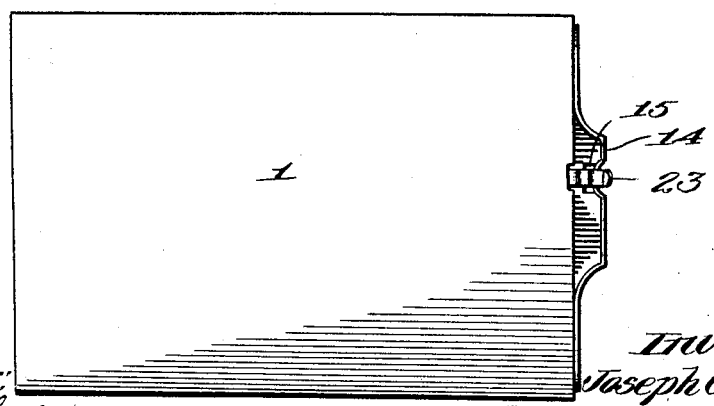

UNITED STATES PATENT OFFICE.

JOSEPH GODDARD, OF ROCHESTER, NEW YORK, ASSIGNOR TO ROCHESTER OPTICAL & CAMERA CO., OF ROCHESTER, NEW YORK, A CORPORATION OF NEW YORK.

PHOTOGRAPHIC-PLATE HOLDER.

SPECIFICATION forming part of Letters Patent No. 700,034, dated May 13, 1902.

Application filed January 17, 1902. Serial No. 90,196. (No model.)

*To all whom it may concern:*

Be it known that I, JOSEPH GODDARD, a citizen of the United States, residing at Rochester, in the county of Monroe and State of New York, have invented new and useful Improvements in Photographic-Plate Holders, of which the following is a specification.

This invention relates to a photographic-plate holder; and it has for its object to provide a metallic plate-holder which will be exceedingly light and compact, and to provide such a plate-holder with a novel catch for holding the slide in place and so constructed and arranged that the operator may with one hand simultaneously release the catch and withdraw the slide and whereby the catch is caused to automatically engage and hold the slide in place by the mere act of pushing the slide in the frame.

It also has for its object to improve and simplify the construction and render more efficient the operation of this class of plate-holders generally.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a view in perspective of my improved photographic-plate holder, parts being shown as separated from one another. Fig. 2 is a transverse section of my plate-holder. Fig. 3 is a longitudinal section. Fig. 4 is an enlarged section of a portion of the plate-holder. Fig. 5 is a view of the plate-holder with the slide removed. Fig. 6 is a view of the plate-holder with the slide inserted, taken from the opposite side to that of Fig. 5.

As herein illustrated, the plate-holder comprises a plate-holder frame, a skeleton frame inserted therein, a light-excluding device, a slide, and a spring-catch for positively locking the slide in place.

Referring to the drawings, the numeral 1 indicates the body of the plate-holder frame, consisting of a rectangular piece of sheet metal bent up at its sides to form upwardly and inwardly projecting flanges 2 and bent up at its ends to form flanges 3 and 4, the flange 3 extending upwardly and inwardly in a manner similar to the flanges 2, and the flange 4 being bent inwardly in a plane slightly above the body 1 and beneath the plane of the flanges 2. Fitted within the plate-holder frame is the skeleton frame, consisting of a sheet-metal plate 5, having its central portion removed, as shown at 6, and provided at its opposite ends with inwardly-extending and upwardly-projecting integral spring-fingers 7. The skeleton frame is provided on its opposite sides with upturned and outwardly-projecting flanges 8 and at its opposite ends with upturned and inwardly-extending flanges 9, the said flanges 8 engaging the under sides of the flanges 2 of the plate-holder, by which means the skeleton frame is held in place in said holder, the rear end flange 9 of the skeleton frame being disposed under the end flange 3 of the plate-holder.

In practice the skeleton frame is slipped into place within the holder before the end flange 4 is bent up. Arranged under the rear end flange 9 of the skeleton frame is a bow-spring 10, which operates in practice to push the forward end of the sensitized plate under the front flange 9 of the skeleton frame in the usual and well-known manner. As shown, the skeleton frame is somewhat shorter than the plate-holder frame, and arranged between the front end of said skeleton frame and the flange 4 of the plate-holder frame is a light-excluding device consisting of a strip of sheet metal 11, provided at its opposite edges with downwardly and thence outwardly bent flanges 12, which rest on the bottom edge of the plate-holder frame, the forward flange 12 fitting under the flange 4 of the plate-holder frame and its rear flange bearing against the front flange 9 of the skeleton frame, whereby the skeleton frame and the light-excluding device are held firmly against movement within the plate-holder frame. Attached to the upper side of the strip 11 is a strip of velvet, plush, felt, or similar material, which will freely yield to permit of the insertion of a plate, but which will operate to effectually exclude the light after the plate has been inserted in place. After the skeleton frame and light-excluding device have been inserted in place in the plate-holder frame the forward end flange 4 of the latter is then bent up into place, securely locking the said parts in place in the plate-holder frame.

The numeral 13 indicates the slide, consisting of a rectangular sheet-metal plate, which is adapted to be slid underneath the flanges 2 and 3 of the plate-holder frame and above the flanges 8 and 9 of the skeleton frame. Said plate is provided at its forward end with a vertical depending flange 14, which is preferably offset intermediate the edges of said slide, as shown, and in said offset portion is formed a slot 15.

The numeral 16 indicates the catch, consisting of a piece of resilient sheet metal provided at one end with the flat head 17, having formed integral therewith an outwardly-projecting spring-finger and on each side of said spring-finger two outwardly-projecting wings 18, which are disposed parallel to said spring-finger. The rear end of the head 17 and the free ends of the wings 18 are provided with downwardly-projecting flanges 19. As shown, the spring-finger 20 projects beyond the ends of the wings 18 and is bent upwardly and outwardly and thence downwardly to form a rib 21 and is then bent upwardly to form a loop or corrugation 22 and is finally bent downwardly at an angle to form a beveled end 23. The catch is secured in place by inserting the head between the flanges 12 of the strip 11, the flanges 19 of said head bearing against the inner sides of the flanges 12 of said strip, so as to hold said head against endwise movement, and the forward flange 12 of the strip and the flange 4 of the plate-holder frame are slotted or cut away, as at 24, to permit of the passage therethrough of the spring-finger 20. The catch is thus firmly held in place and in position to engage the offset flange of the slide. The sensitized plate is inserted within the plate-holder in the usual and well-known manner. The bow-spring 10 and the spring-fingers 7 operate to firmly and immovably hold the plate in position. The slide is then pushed into place in manner before described, and just before it reaches the limit of its inward movement the offset portion of the flange 14 engages the beveled end 23 of the catch and depresses the latter, and on the final inward movement of the slide the flange 14 snaps over said beveled end of the catch into corrugation 22, whereby the slide is immovably held against movement in either direction. When it is desired to withdraw the slide, the operator has merely to place his thumb behind the offset portion of the flange 14 of the slide and at the same time press with his forefinger against the end of the spring 7, whereby the latter is forced out of engagement with the flange and the slide may be freely withdrawn.

I am aware that I am not, broadly, the first to provide in a photographic-plate holder a spring-catch that will automatically yield when the slide is pushed into place and lock the slide in place in the holder and which may be engaged and released by the same hand that is employed to withdraw the holder. I therefore do not claim such broadly.

Having described my invention, what I claim is—

1. In a photographic-plate holder, the combination with the plate-holder frame and the slide provided at its outer end with a depending flange, of a spring-catch fixed to the front end of the plate-holder frame and projecting beyond the latter, said catch being arranged to automatically yield to said flange when the slide is pushed into place and having a projecting end adapted to be engaged by the same hand employed to withdraw the slide, whereby the catch may be released and the slide withdrawn at one movement of the hand, substantially as described.

2. In a photographic-plate holder, the combination with the plate-holder frame and the slide provided at its end with a depending flange, of a spring-catch fixed to the front end of the plate-holder frame and projecting beyond the latter, said catch comprising a spring-finger provided with a beveled end adapted to be engaged by and thrust aside by the flange on the slide and with a corrugated portion arranged to snap under the lower edge of said flange and lock the slide in place, substantially as described.

3. In a photographic-plate holder, the combination with the plate-holder frame and the slide provided at its outer end with a depending flange, of a spring-catch fixed to the front end of the plate-holder frame and projecting beyond the latter, said catch comprising a spring-finger provided with a beveled end adapted to be engaged by and thrust aside by the flange on the slide and with a corrugated portion arranged to snap under the lower edge of said flange and hold the slide in place, and a transverse strip fitted in the front end of the plate-holder frame and longitudinally grooved on its under side, the said spring-finger being provided at its inner end with a flat head fitted in said groove, substantially as described.

4. In a photographic-plate holder, the combination with the plate-holder frame, of a light-excluding device, consisting of a transverse strip fitted in the front end of the plate-holder frame and provided on its upper side with a light-excluding brush, and having a groove on its under side, of the slide provided at its free end with a depending flange, and a spring-catch comprising a flat head fitted between the grooved portion of said strip and the bottom of the plate-holder frame and having an outwardly-projecting spring-finger arranged to engage the said flange and hold the slide in place, substantially as described.

5. In a photographic-plate holder, the combination with a plate-holder frame, of a light-excluding device, consisting of a transverse strip fitted in the front end of the frame and provided on its upper side with a light-excluding brush and having a groove on its under side, of a slide provided at its free end with a depending flange, and a spring-catch comprising a flat head, having two parallel wings, the rear edge of the head and the free ends of the wings having depending flanges, said head being fitted in said groove, and an integral spring-finger projecting outward from the head and arranged to engage the flange on the slide and hold the latter in place, substantially as described.

6. In a photographic-plate holder, the combination with a plate-holder frame and its slide, of a skeleton frame fitted in the plate-holder frame and comprising a rectangular sheet-metal frame provided at its opposite inner ends with integral inwardly and upwardly projecting spring-fingers, arranged to engage the under side of the plate, substantially as described.

7. In a photographic-plate holder, the combination with a metal plate-holder frame having inwardly-bent flanges, of a sheet-metal slide, and a skeleton frame, comprising a rectangular sheet-metal frame, provided with upwardly and inwardly bent flanges arranged to fit beneath the flanges of the plate-holder frame and provided at its opposite inner ends with inwardly and upwardly projecting integral spring-fingers, substantially as described.

In testimony whereof I have hereunto set my hand in presence of two subscribing witnesses.

JOSEPH GODDARD.

Witnesses:
 MINNA STULL,
 GEO. W. REILLY.